(12) United States Patent
Tamaki et al.

(10) Patent No.: US 8,197,955 B2
(45) Date of Patent: *Jun. 12, 2012

(54) ELECTROLYTE MEMBRANE, METHODS OF MANUFACTURE THEREOF AND ARTICLES COMPRISING THE SAME

(75) Inventors: Ryo Tamaki, Santa Clarita, CA (US); Steven Thomas Rice, Scotia, NY (US); Gary William Yeager, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/202,832

(22) Filed: Sep. 2, 2008

(65) Prior Publication Data

US 2010/0055535 A1 Mar. 4, 2010

(51) Int. Cl.
*H01M 8/10* (2006.01)
*B05D 5/12* (2006.01)
*H01M 8/00* (2006.01)
*B05D 5/00* (2006.01)

(52) U.S. Cl. .......... 429/33

(58) Field of Classification Search .......... 429/33, 429/409, 422, 524; 427/115; 521/26, 27
See application file for complete search history.

(56) References Cited

U.S. PATENT DOCUMENTS

| 6,635,384 B2 | 10/2003 | Bahar et al. |
| 7,258,941 B2 | 8/2007 | Hirano et al. |
| 2003/0211264 A1 | 11/2003 | Farnsworth et al. |
| 2006/0275637 A1 | 12/2006 | Nakazawa et al. |
| 2008/0114183 A1 | 5/2008 | Moore et al. |
| 2008/0160378 A1 | 7/2008 | Geormezi et al. |

FOREIGN PATENT DOCUMENTS

| DE | 10326703 A1 | 2/2001 |
| JP | 2006128066 A1 | 5/2006 |
| WO | 2005053060 A2 | 3/2009 |
| WO | 2009038268 A1 | 3/2009 |

OTHER PUBLICATIONS

Claims of U.S. Appl. No. 12/202,754.*
GB0911302.8 Search Report, Jan. 29, 2010.
H.C. Lee et al., Preparation and evaluation of sulfonated-fluorinated poly(arylene ether)s membranes for a proton exchange membrane fuel cell (PEMFC). Science Direct, Electrochimica Acta, vol. 49, 2004, pp. 2315-2323.
DE10326703 Abstract, Feb. 26, 2004.
JP2007297346 Abstract, Nov. 15, 2007.

* cited by examiner

*Primary Examiner* — Duc Truong
(74) *Attorney, Agent, or Firm* — Ann M. Agosti (57) ABSTRACT

Disclosed herein is a method of forming an electrolyte membrane comprising forming a mixture; the mixture comprising a polyhydroxy compound, an aromatic polyhalide compound and an alkali metal hydroxide; disposing the mixture on a porous substrate; reacting the mixture to form a proton conductor; and crosslinking the proton conductor to form a crosslinked proton-conducting network. Disclosed herein too is an article comprising a porous substrate; and a crosslinked proton conductor disposed on the porous substrate.

21 Claims, 2 Drawing Sheets

FIG. 1

ELECTROLYTE MEMBRANE, METHODS OF MANUFACTURE THEREOF AND ARTICLES COMPRISING THE SAME

FEDERAL RESEARCH STATEMENT

This invention was made with Government support from the U.S. Department of Energy under Contract No. DE-FG36-06GO16034. The Government has certain rights in the invention.

BACKGROUND

This disclosure relates to an electrolyte membrane, methods of manufacture thereof and articles comprising the same. In particular, this disclosure relates to an electrolyte membrane that can be used in a fuel cell.

The interest in fuel cells, as a clean, alternative power source, has motivated intense research in the area of fuel cell development. In particular, proton exchange membrane (PEM) fuel cells are currently in development for use in transport as well as in stationery and portable applications. One of the challenges lie in meeting commercial performance targets for both automotive and portable applications, as well as decreasing the cost associated with the production of PEM fuel cells.

Currently, commercially available fuel cells use Nafion® or other perfluorosulfonic acid polymer membranes as a polymer electrolyte. These materials possess good proton conductivity as well as good chemical and mechanical stability under humid conditions encountered in a fuel cell. However, the widespread use of these membranes has been limited by cost and long-term performance. One of the primary challenges impairing the achievement of long-term PEM performance is improvement of the mechanical strength and thermal stability of the membranes.

When the membranes are exposed to cycles characterized by excessively humid or dry conditions, commercially available membranes experience significant dimensional changes, particularly if they are prone to swelling or shrinking. These dimensional changes often result in the structural failure of the membrane, resulting in the development of cracks, tears or other deformations of the membrane. These structural failures can lead to premature failure of the fuel cell.

Accordingly, therefore there is a need for a proton exchange membrane with improved mechanical and thermal stability.

SUMMARY

Disclosed herein is a method of forming an electrolyte membrane comprising forming a mixture; the mixture comprising a polyhydroxy compound, an aromatic dihalide compound and an alkali metal hydroxide; disposing the mixture on a porous substrate; reacting the mixture to form a proton conductor; and crosslinking the proton conductor to form a cross-linked proton-conducting network.

Disclosed herein too is a method of forming an electrolyte membrane comprising forming a first mixture, the first mixture comprising a dihydroxy compound, an alkali metal hydroxide, and a compound of formula (IV):

where $R^{16}$, $R^{17}$ and $R^{18}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and n, o and p are each independently integers of 1 to about 4; adding to the first mixture a compound of formula (V):

where X is a halogen and $R^{19}$ and $R^{20}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and q and r are each independently integers of 1 to 3; disposing the second mixture on a porous substrate; and reacting the second mixture to form a proton conductor on the porous substrate.

Disclosed herein too is an article comprising a porous substrate; and a crosslinked proton conductor disposed on the porous substrate.

These and other features, aspects, and advantages of the disclosed embodiments will become better understood with reference to the following description and appended claims.

BRIEF DESCRIPTION OF THE DRAWINGS

The disclosed subject matter is particularly pointed out and distinctly claimed in the claims at the conclusion of the specification. The foregoing and other objects, features, and advantages of the disclosed embodiments are apparent from the following detailed description taken in conjunction with the accompanying drawings in which:

The detailed description explains the preferred embodiments, together with advantages and features, by way of example with reference to the drawings.

DETAILED DESCRIPTION

The terms "the", "a" and "an" do not denote a limitation of quantity, but rather denote the presence of at least one of the referenced item. The suffix "(s)" as used herein is intended to include both the singular and the plural of the term that it modifies, thereby including at least one of that term (e.g., the colorant(s) includes at least one colorants). Unless defined otherwise, technical and scientific terms used herein have the same meaning as is commonly understood by one of skill in the art. As used herein, the terms "first," "second." and the like do not denote any order or importance, but rather are used to distinguish one element from another.

As used herein, approximating language can be applied to modify any quantitative representation that can vary without resulting in a change in the basic function to which it is related. Accordingly, a value modified by a term or terms, such as "about" and "substantially," cannot to be limited to the precise value specified, in some cases. In at least some instances, the approximating language can correspond to the precision of an instrument for measuring the value. Thus the modifier "about" used in connection with a quantity is inclusive of the stated value and has the meaning dictated by the context (e.g., includes the degree of error associated with measurement of the particular quantity).

The notation "±10%" means that the indicated measurement can be from an amount that is minus 10% to an amount that is plus 10% of the stated value. Furthermore, all ranges disclosed herein are inclusive of the endpoints and are independently combinable. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.).

"Optional" or "optionally" means that the subsequently described event or circumstance can or cannot occur, and that the description includes instances where the event occurs and instances where it does not. All cited patents, patent applications, and other references are incorporated herein by reference in their entirety As used herein, "substrate" or "substrates" can be used interchangeably with "surface" or "surfaces."

Disclosed herein is a method of producing an electrolyte membrane that comprises disposing a proton conductor on a porous substrate. The proton conductor is subsequently crosslinked to form a crosslinked proton conductor in the pores of the porous substrate. In one embodiment, the proton conductor is a polyethersulfone derived from the reaction of a polyhydroxy compound with an aromatic polyhalide compound. The polyhydroxy compound as defined herein can have two or more hydroxyl groups. In one embodiment, the polyhydroxy compound can be a trishydroxy compound or a tetrahydroxy compound.

An exemplary trishydroxy compound is tris(hydroxyphenyl)ethane while an exemplary aromatic dihalide compound is sulfonated difluorodihalophenylsulfone (SDFDPS). By disposing the proton conductor on a porous substrate, the proton conductor can be formed within and between the pores of the porous substrate to form the electrolyte membrane. The crosslinking can thus occur in the pores of the electrolyte membrane.

The use of the crosslinked proton conductor suppresses water solubility, which increases the dimensional stability of the electrolyte membrane. Crosslinking also prevents the dissolution of electrolytes. In one embodiment, the crosslink density of the polyethersulfone can be controlled by adding a dihydroxy compound to the polyhydroxy compound and deprotonating both the dihydroxy compound and the polyhydroxy compound prior to reacting them with the aromatic dihalide compound to produce a crosslinked polyethersulfone. The crosslink density of the polyethersulfone can be controlled by the weight ratio of the dihydroxy compound to the polyhydroxy compound.

The porous substrate can comprise an organic polymer. Porous supports include polymers derived from aliphatic or aromatic hydrocarbons. The polymers useful in the generation of porous supports include polysulfones, polyethersulfones, polybenzonitriles, polyamidesulfones, polyamidebenzonitriles, polythioethersulfones, polybenzimidazoles, polyimides, polyamideimides, polyetherimides, polyphenylenes, polyarylene ethers, polyacrylonitriles, polysaccharides, cellulose and cellulosic esters and ethers, polyolefins, polyamides, polycarbonates, cellulosic polymers, polyurethanes, polyesters, polyethers, polyacrylates, copolyether esters, copolyether amides, fluoropolymers, or the like, or a combination comprising at least one of the foregoing organic polymers.

An exemplary organic polymer for use in the porous substrate is a fluoropolymer. Examples of suitable fluoropolymers are polytetrafluoroethylene, poly(vinylidene fluoride), poly(vinylidene fluoride co-hexafluoropropylene), poly(tetrafluoroethylene oxide-co-difluoromethylene oxide, poly(tetrafluoroethylene-co-perfluoro(propylvinyl ether)), polyvinylidene difluoride, polytetrafluoroethylene, poly(ethylene-co-tetrafluoroethylene), poly(tetrafluoroethylene-co-isopropylvinyl ether), or the like, or a combination comprising at least one of the foregoing fluoropolymers.

An exemplary fluoropolymer is porous polytetrafluoroethylene, specifically a membrane of expanded porous PTFE (sometimes referred to as ePTFE). The porous polytetrafluoroethylene is generally used in the form of a sheet.

Porous polytetrafluoroethylene sheet can be made by commercial processes, for example, by stretching or drawing processes, by papermaking processes, by processes in which filler materials are incorporated with the PTFE resin that are subsequently removed to leave a porous structure, or by a powder sintering processes. In one embodiment, the porous polytetrafluoroethylene sheet can be a porous expanded polytetrafluoroethylene sheet having a structure of interconnected nodes and fibrils. The nodes and fibrils can define an internal structure having a three-dimensional network of interconnected passages and pathways that extend vertically, from surface to surface, and laterally, from edge to edge, throughout the membrane.

The porous substrate can have a thickness of about 3 to about 1,000 micrometers, specifically about 5 to about 500 micrometers, and more specifically about 10 to about 200 micrometers. The porous substrate can have a porosity of about 20 to about 98 volume percent, specifically about 30 to about 95 volume percent, and more specifically about 50 to about 90 volume percent, based on the total volume of the porous substrate. In addition, the porous substrate can have an average pore size of about 0.01 to about 20 micrometers, specifically about 0.05 to about 15 micrometers, and more specifically about 0.1 to about 10 micrometers. The thickness of the porous substrate can be about 10 to about 500 micrometers, specifically about 20 to about 150 micrometers, and more specifically about 25 to about 50 micrometers.

A porous substrate that comprises expanded porous PTFE is QM702® commercially available from General Electric Corporation.

As noted above, the proton conductor is disposed on the porous substrate to form the electrolyte membrane. The proton conductor is generally a polymer having aromatic groups on its backbone. Aromatic groups provide thermal resistance, oxidation resistance, flexibility, and membrane formability. The proton conductor also comprises proton acid groups that readily exchange protons.

In an exemplary embodiment, the proton conductor is a protonic acid containing aromatic polymer. Examples of suitable protonic acid containing aromatic polymers are protonic acid containing aromatic polyethers, polyetherketones, polyarylethers, polyphenylene ethers, polybenzimidazoles, polyethersulfones, polysulfones, polybenzoxazoles, polybenzothiazoles, polythiazoles, polyphenylquinoxalines, polypyridines, polypyrimidines, polyoxathiazoles, polytetrazapyzarenes, polyvinylpyridines, polyvinylimidazoles, polypyrrolidones, or the like, or a combination comprising at least one of the foregoing protonic acid containing aromatic polymers.

In another embodiment, a sulfonated derivative of a protonic acid containing polyetherketone, polyarylene ether, polyphenylene ether, polybenzimidazole, polyethersulfone, polysulfone, polybenzoxazole, polybenzothiazole, polythiazole, polyphenylquinoxaline, polypyridine, polypyrimidine, polyoxathiazole, polytetrazapyzarene, polyvinylpyridine, polyvinylimidazole, polypyrrolidone or the like, or a combination comprising at least one of the foregoing sulfonated derivative of a protonic acid containing polymers may be disposed upon the porous substrate. An exemplary proton conductor is a polyethersulfone that is reacted with a protonic acid.

The aromatic polyhydroxy compound can have a functionality of greater than or equal to 2. In one embodiment, the polyhydroxy compound can a functionality of greater than or equal to 3. In one embodiment, the polyhydroxy compound can a functionality of greater than or equal to 4.

An aromatic polymer for use as the proton conductor can be produced by the reaction of a polyhydroxy and/or polymercapto compound with an aromatic polyhalide compound. A suitable polyhydroxy or polymercapto compound has a structure shown in Formula (I) below:

wherein B is a hydrogen, alkyl, aryl or a protonic acid containing group such as a sulfonate group (—$SO_3H$), a carboxylate group (—COOH), a phosphate group (—$PO_3H_2$), an alkylsulfonate group —$(R^4)_nSO_3H$), a sulfamoylsulfonylalkyl group or a sulfamoylsulfonylaryl group ((—$SO_2NHSO_2R$), wherein R is alkyl or aryl), a perfluoroalkylsulfonate group ($CF_2)_nSO_3H$), a sulfonylalkylsulfonate group ($SO_2(R^4)_nSO_3H$), a sulfonylperfluoroalkylsulfonate group ($SO_2(CF_2)SO_3H$), a sulfamoylsulfonylalkylsulfonate ($SO_2NHSO_2(R^4)_nSO_3H$), sulfamoylsulfonylperfluoroalkylsulfonate group ($SO_2NHSO_2(CF_2)_nSO_3H$), an alkylcarboxylate group (—$(R^4)_nCOOH$), a perfluoroalkylcarboxylate group ($CF_2)_n CO_2H$, an alkylphosphonate group (—$(R^4)_nPO_3H_2$), an perfluoroalkylphoshonate group, or their respective conjugated salts; the conjugated salt having a metal cation from Group I of the periodic table. $R^1$ and $R^2$ are each independently a hydrogen atom, a halogen atom, a $C_{1-10}$ alkyl group, a halogen-substituted $C_{1-10}$ alkyl group or a $C_{6-50}$ aryl group. q and r are independently integers from 1 to about 4. In the Formula (I) above, $R_3$ can be a hydrogen atom, a halogen atom, a $C_{1-10}$ alkyl group, a halogen-substituted $C_{1-10}$ alkyl group, a $C_{6-50}$ aryl group, or a halogen-substituted $C_{6-50}$ aryl group, while $R^4$ is an alkyl, aryl or perfluoroalkyl group. W is selected from the group consisting of wherein $R^c$ and $R^d$ each independently represent a hydrogen atom or a monovalent linear or cyclic hydrocarbon group, and $R^e$ is a divalent hydrocarbon group, oxygen, or sulfur. In the Formula (I) above, X is O, S, or $SO_2$.

An exemplary polyhydroxy compound has a structure shown in Formula (II) below:

where $R^5$, $R^6$ $R^7$ and $R^8$ are each independently a hydrogen atom, a halogen atom, a $C_{1-10}$ alkyl group, a halogen-substituted $C_{1-10}$ alkyl group, a $C_{6-50}$ aryl group, or a halogen-substituted $C_{6-50}$ aryl group, and n, o and p are each independently integers of 1 to about 4. In one embodiment, $R^5$, $R^6$, $R^7$ and $R^8$ are each independently a hydrogen atom or a halogen atom and n, o and p are each independently integers of 1 to about 4. In another embodiment, $R^5$, $R^6$, $R^7$ and $R^8$ are each a halogen atom and n, o and p are each independently integers of 1 to about 4. In an exemplary embodiment, $R^5$, $R^6$, $R^7$ and $R^8$ are each a hydrogen atom.

The aromatic polyhalide compound can have can have a functionality of greater than or equal to 2. In one embodiment, the aromatic polyhalide compound can have a functionality of greater than or equal to 3. In one embodiment, the aromatic polyhalide compound can have a functionality of greater than or equal to 4.

The aromatic polyhalide compound can have the structure shown in Formula (III) below:

where X is a halogen and $R^9$ and $R^{10}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and s and t are each independently integers of 1 to 4. $R^{11}$ represents one of the following groups and C is a protonic acid containing group such as a sulfonate group (—$SO_3H$), a carboxylate group (—COOH), a phosphate group (—$PO_3H_2$), an alkylsulfonate group (—$(R^{12})_nSO_3H$), a sulfamoylsulfonylalkyl or sulfamoylsulfonylaryl group (—$SO_2NHSO_2R$, wherein R is alkyl or aryl), a perfloruoalkylsulfonate group $(CF_2)_nSO_3H)$, a sulfonylalkylsulfonate group $(SO_2(R^{12})_nSO_3H)$, a sulfonylperfluoroalkylsulfonate group $(SO_2(CF_2)SO_3H)$, a sulfamoylsulfonylalkylsulfonate group $(SO_2NHSO_2(R^{12})_nSO_3H)$, a sulfamoylsulfonylperfluoroalkylsulfonate group $(SO_2NHSO_2(CF_2)_nSO_3H)$, an alkylcarboxylate group (—$(R^{12})_nCOOH$), a perfluoroalkylcarboxylate group $(CF_2)_nCO_2H$, an alkylphosphonate group (—$(R^{12})_nPO_3H_2$) an perfluoroalkylphoshonate group or their conjugated salts; the conjugated salts having a metal cation from Group I of the periodic table. $R^{12}$ can be an alkyl, aryl or perfluoroalkyl group.

In an exemplary embodiment, the aromatic polyhalide compound can have the structure shown in Formula (IV) below:

where X is a halogen, $R^{13}$ and $R^{14}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and q and r are each independently integers of 1 to 3. $R^{15}$ represents one of the following groups:

wherein $R^c$ and $R^d$ each independently represent a hydrogen atom or a monovalent linear or cyclic hydrocarbon group, and $R^e$ is a divalent hydrocarbon group, oxygen, or sulfur. M represents a metal cation from Group I of the periodic table. In an exemplary embodiment, M is sodium or potassium. In an exemplary embodiment, the aromatic dihalide is an aromatic sulfonated dihalide.

With reference to the formula (IV), in an exemplary embodiment, $R^{13}$ and $R^{14}$ are each independently a hydrogen atom or a halogen atom, M is sodium, X is fluorine, and q and r are each independently integers of 1 to 3.

Other examples of aromatic polyhalide compounds are (tris(4-fluorophenyl)phosphine oxide), tris(2,4-difluorophenylphosphine oxide) or tris(2,4,6-trifluorophenylphosphine oxide), bis(2,4-difluorophenyl)sulfone, bis(2,4,6-trifluorophenyl)sulfone, 2,4,6-trifluorobenzonitrile, decafluorobiphenyl, or the like, or a combination comprising at least one of the foregoing aromatic polyhalide compounds.

In one embodiment, when the aromatic polyhydroxy compound has a functionality of 2, the aromatic polyhalide compound has a functionality of greater than or equal to about 3, while when the aromatic polyhydroxy compound has a functionality of greater than or equal to about 3, the aromatic polyhalide compound has a functionality of 2.

In one embodiment, the crosslinked polyethersulfone is produced by reacting a trishydroxy compound having the Formula (V) with an aromatic dihalide compound having the Formula (VI).

In the Formula (V) above, $R^{16}$, $R^{17}$ and $R^{18}$ are each a halogen atom and n, o and p are each independently integers of 1 to about 4. In another embodiment, $R^{16}$, $R^{17}$ and $R^{18}$ are each independently a hydrogen atom.

In the Formula (VI) above, X is a halogen and $R^{19}$ and $R^{20}$ are each independently a hydrogen atom, a halogen atom, a $C_{1-10}$ alkyl group, a halogen-substituted $C_{1-10}$ alkyl group, a $C_{6-10}$ aryl group, or a halogen-substituted $C_{6-10}$ aryl group, and q and r are each independently integers of 1 to 3.

In an exemplary embodiment, the compound of Formula (V) is tris(hydroxyphenyl)ethane, while the compound of Formula (VI) is sulfonated difluorodihalophenylsulfone. In one embodiment, the proton conductor is obtained by deprotonating the tris(hydroxyphenyl)ethane initially in methanol with a base catalyst. Methanol is then removed by distillation and the deprotonated tris(hydroxyphenyl)ethane is dissolved in water. To the aqueous solution is added the sulfonated difluorodihalophenylsulfone compound. The sulfonated difluorodihalophenylsulfone compound is dissolved into the aqueous solution at room temperature. Titanium tetraisopropoxide (TIP) in isopropanol (IPA) could be added to increase water retention. The obtained solution was coated on ePTFE and the monomers are cured in-situ, resulting in the cross-linked polyethersulfone in pores of ePTFE.

Details of the reaction between the trishydroxy compound of formula (V) and the compound of formula (VI) to produce cross-linked polyethersulfone and the consequent manufacturing of the electrolyte membrane will now be provided below. The exemplary reaction between the tris(hydroxyphenyl)ethane (compound of formula (V)) and sulfonated difluorodihalophenylsulfone compound of formula (VI) to produce cross-linked polyethersulfone is shown in the reaction (I) below.

(I)

In the reaction (I) above, the tris(hydroxyphenyl)ethane is first deprotonated with an alkali metal hydroxide. The deprotonated tris(hydroxyphenyl)ethane is then reacted with the sulfonated difluorodihalophenylsulfone to yield polyethersulfone which can then be crosslinked after being disposed upon the porous substrate.

The molar ratio of the compound of formula (V) to the compound of formula (VI) can be about 1:1 to about 1:10, specifically about 1:1.1 to about 1:2, and more specifically about 1:1.3 to about 1:1.8. In an exemplary embodiment, the molar ratio of the compound of formula (V) to the compound of formula (VI) is about 1:1.5.

As noted above, the deprotonation of the trishydroxy compound of formula (V) is conducted with an alkali metal hydroxide. Examples of suitable alkali metal hydroxides are lithium hydroxide, sodium hydroxide, potassium hydroxide, rubidium hydroxide, cesium hydroxide, or the like, or a combination comprising at least one of the foregoing alkali metal hydroxides. In an exemplary embodiment, the alkali metal hydroxide is potassium hydroxide.

In one embodiment, the trishydroxy compound of formula (V) can first be heated with the alkali metal hydroxide to form a reaction mixture that comprises the deprotonated compound of formula (VI). The mixture is heated to reflux. The compound of formula (VI) is then added to the reaction mixture.

The molar ratio of the trishydroxy compound of formula (V) to the alkali metal hydroxide can be about 1:1 to about 1:10, specifically about 1:1.1 to about 1:7, and more specifically about 1:2 to about 1:5. In an exemplary embodiment, the molar ratio of the trishydroxy compound of formula (V) to the alkali metal hydroxide is 1:3.

The reaction between the trishydroxy compound of formula (V) and the compound of formula (VI) can be conducted in the presence of a suitable solvent. The solvent can comprise a first solvent and a second solvent. In one embodiment, the trishydroxy compound of formula (V) and the alkali metal hydroxide can be heated with a first solvent prior to addition of the compound of formula (VI). After heating, the first solvent can be removed prior to the addition of the compound of formula (VI).

The first solvent can be a hydrophilic organic solvent. The first solvent can comprise an alcohol, amide, ketone, nitrile, sulfoxide, sulfone, thiophene, ester, amide, or the like, or a combination comprising at least one of the foregoing solvents. The first solvent is methanol, ethanol, propanol, isopropanol, butanolglycerol, ethylene glycol, diethylene glycol, triethylene glycol, N-methylpyrollidinone, N,N-dimethylformamide, N,N-dimethylacetamide, acetone, methyl ethyl ketone, acetonitrile, dimethylsulfoxide, diethyl sulfone, tetrahydrothiophene 1,1-dioxide, or the like, or a combination comprising at least one of the foregoing solvents. In an exemplary embodiment, the first solvent is methanol.

The second solvent can be a polar solvent. The second solvent can comprise an alcohol, water, liquid carbon dioxide, a ketone; a nitrile, a sulfoxide, a sulfone, a thiophene, an acetate, an amide, or the like, or a combination comprising at least one of the foregoing solvents. The second solvent is isopropyl alcohol, dimethylsulfoxide, or the like, or a combination comprising at least one of the foregoing solvents. In an exemplary embodiment, the second solvent is a combination of water and dimethylsulfoxide.

While not being bound by theory, the second solvent facilitates wetting of the porous substrate by the monomer mixture, the monomer mixture comprising the monomers used to form the crosslinked polyethersulfone. Thus it is believed that the monomers substantially fills all of the pores of the porous support and, upon polymerization of the monomers, which is believed to occur within the porous substrate, forms a polyethersulfone polymer, which is cross-linked, thus forming a proton-conducting network that is integrated with the porous support. In one embodiment, surfactants can also be used to facilitate the spreading of the monomer mixture on the surface of the porous substrate.

In one embodiment, a metal alkoxide such as for example titanium isopropoxide, zirconium isopropoxide, tetraethylorthosilicate, tetramethylorthosilicate, and the like can be added to the reaction mixture to improve mechanical stability and to facilitate the management of electrical conductivity.

Following the addition of the compound of formula (VI) and the second solvent to the reaction mixture, the mixture is heated to a suitable temperature overnight. In an exemplary embodiment, the reaction mixture is heated to a temperature of about 70 to about 90° C. for a period of about 3 to about 10 hours. The reaction mixture, which comprises monomers, is then cast on both sides of the porous substrate. The monomers penetrate the pores of the porous substrate. The porous substrate is then heated to a temperature that is effective to promote crosslinking of the monomers to form the proton conductor (crosslinked polyethersulfone).

The electrolytic membrane comprises the proton conductor in an amount of about 3 weight percent (wt %) to about 80 wt %, specifically about 10 to about 60 wt %, and more specifically about 20 to about 50 wt %, based on the total weight of the electrolytic membrane.

In one embodiment, the porous substrate with the reaction product of the deprotonated tris(hydroxyphenyl)ethane and the sulfonated difluorodihalophenylsulfone disposed thereon is heated to a first temperature of about 120 to about 175° C. followed by heating to a second temperature of about 220 to about 300° C. The heating is conducted to facilitate the crosslinking of the polymer. In another embodiment, the porous substrate with the monomers disposed thereon is heated to a first temperature of about 140 to about 160° C. followed by heating to a second temperature of about 240 to about 360° C. The porous substrate is heated to the first temperature for a period of about 0.5 to about 4 hours and the second temperature for a period of about 0.5 to about 4 hours. Both the heating at the first temperature and the heating at the second temperature are conducted in an inert atmosphere.

As noted above, the crosslink density of the polyethersulfone can be controlled by deprotonating a dihydroxy compound along with the compound of formula (V) prior to the addition of the compound of formula (VI) to the reaction mixture.

An exemplary reaction between the deprotonated dihydroxy compound, the deprotonated trishydroxy compound of formula (V) and the compound of formula (VI) is shown below in the reaction (II).

-continued

In the reaction (II) above, X is a halogen, while R'=SO$_3$Na. In an exemplary embodiment, the halogen is chlorine, fluorine, bromine, or a combination comprising at least one of the foregoing halogens.

Examples of dihydroxy compounds are 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl)cyclopentane; and bis(hydroxyaryl)cycloalkanes such as 1,1-bis(4-hydroxyphenyl)cyclohexane. Two or more different dihydroxy compounds may also be used. An exemplary dihydroxy compound is bisphenol A.

The weight ratio of the dihydroxy compound to the trishydroxy compound of formula (IV) may be 5:1 to about 1:5, specifically about 4:1 to about 1:4, and more specifically about 3:1 to about 1:3.

In an exemplary embodiment, a mixture of the deprotonated dihydroxy and trishydroxy compounds may be stored along with the halide compound at room temperature without degradation or gelation till it is desired to apply them to the porous substrate prior to crosslinking. The conditions for crosslinking have been provided above.

In one embodiment, the polymers resulting from reactions (I) and (II) can be used in combination with other polymers to form blends or copolymers. They can be advantageously used as impact modifiers, plasticizers, and the like, to control mechanical and processing properties. The polymers resulting from reactions (I) and (II) can be used as blocks in multi-block or segmented copolymers. Block length, ratio of blocks, and molecular weights of the block copolymers can all be varied to optimize conductivity and water swellability.

The electrolyte membrane disclosed herein has a number of advantageous properties over comparative electrolytic membranes. When evaluated by thermogravimetric analysis (TGA) before acidification, the electrolyte membrane disclosed herein is stable to a temperature of up to about 563° C. After acidification, the disclosed electrolyte membrane, when evaluated by TGA, is stable to a temperature of up to about 285° C. In one embodiment, the electrolyte membrane, when evaluated by TGA analysis before acidification can be stable up to about 400° C., specifically up to about 500° C. and more specifically up to about 600° C. In an embodiment the electrolyte membrane, when evaluated by TGA analysis after acidification can be stable to up to about 200° C., specifically up to about 225° C. and more specifically up to about 250° C.

The disclosed electrolyte membrane also displays excellent dimensional stability. When the electrolyte membrane is immersed in water (at 25° C.) for about 24 hours, its area change rate before and after immersion can be less than or equal to about 20 percent, specifically less than or equal to about 10 percent, and more specifically less than or equal to about 3 percent. If the area change rate is less than or equal to about 20 percent, adhesion of the electrolyte membrane surface to a catalyst layer can be enhanced and interfacial resistance between the electrolyte membrane and the catalyst layer can be minimized.

An additional benefit to the use of an electrolyte membrane having a cross-linked structure is the introduction of a greater number of acid groups in the electrolyte membrane. In commercially available electrolyte membranes, the number of acid groups per polymer chain is limited due to water solubility and swelling in the presence of acid groups. The disclosed electrolyte membrane also displays chemical resistance. The disclosed electrolyte membrane can have a high oxidation resistance and is resistant to oxidizers, such as hydrogen peroxide that can be generated within the electrolyte membrane.

When the electrolyte membrane is immersed into a solution containing about 3 weight percent of hydrogen peroxide and about 5 parts per million of FeSO$_4$ at about 80° C. for about 1 hour, the weight change before and after the immersion can be less than or equal to about 10 percent, specifically less than or equal to about 5 percent, or less than or equal to about 2 percent. If the weight change is less than or equal to about 10 percent, an electrochemical cell which uses the disclosed electrolyte membrane can provide long-term stability.

The proton conductivity at about 80° C. and about 50% humidity can be equal to or greater than or equal to about 0.001 S/cm, specifically greater than or equal to about 0.01 S/cm, and more specifically greater than or equal to about 0.1 S/cm.

The electrolyte membrane thus obtained may be used in fuel cells, batteries, a fuel cell, a battery, a catalyst support or a catalyst. It can be used in water purification systems, as a polymeric catalyst or as a catalyst support if desired. In their basic forms (as sulfonate salts), these materials could serve as anion transport media, for transport of ions such as Na, Li, or the like.

The disclosure is further illustrated by the following non-limiting examples.

EXAMPLES

Example 1

This example was conducted to demonstrate the manufacturing of the electrolytic membrane. Tris(hydroxyphenyl)ethane (THPE), in an amount of 1.075 g (3.51 mmol), was added to a flask equipped with a Dean-Stark condenser. To the flask, 0.590 g (10.5 mmol) KOH, and 33 ml of methanol were added. The mixture was refluxed for about 40 minutes to promote the deprotonation of the THPE. Following the removal of methanol, 2.41 g (5.26 mmol) of sulfonated difluorodihalophenylsulfone (SDFDPS) was added to the flask. The mixture was dissolved in 14 ml of water by heating the mixture at 60° C. for 5 minutes. The mixture was cooled to room temperature at which time 15 ml isopropanol and 1.3 ml dimethylsulfoxide was added to the mixture in order to increase the wetting of the ePTFE substrate (QM702, General Electric Company). The solution was cast onto both sides of the ePTFE, which was supported on a plastic hoop. The film was dried at 140° C. in nitrogen for 4 days. The resulting film was rinsed with distilled, deionized (DI) water to remove KF and then air dried at room temperature. The dried film was then soaked in a solution of 1.0M $H_2SO_4$ overnight to convert the sodium salt to the sulfonic acid.

Following a rinse of the film with deionized water and subsequent drying at room temperature, the proton conductivity of the film was measured using AC impedance. The thickness of the film was 5.2 μm, the width was 0.599 cm, and the length of the film was 0.425 cm. Conductivity measurements were performed at 60, 80, 100, and 120° C. at a relative humidity of 50, 75 and 100%. Nafion 112 film was provided as a comparison. The results for the proton conductivity test at a controlled relative humidity of 50%, and at temperatures of 60, 80, 100, and 120° C., are shown in Table 1.

TABLE 1

| | | Comparative Example 1 (Nafion 112) | | Example 1 | |
|---|---|---|---|---|---|
| Temp [° C.] | % RH | Conductivity | Error | Conductivity | Error |
| 60 | 50 | 0.0097 | 0.00180 | 0.0250 | 0.00287 |
| 80 | 50 | 0.0129 | 0.00214 | 0.0118 | 0.00203 |
| 100 | 50 | 0.0155 | 0.00236 | 0.0038 | 0.00087 |
| 120 | 50 | 0.0214 | 0.00271 | 0.0035 | 0.00083 |

As shown in Table 1, the proton conductivity of the material of Example 1, sulfonated cross-linked polyethersulfone, at 50% relative humidity is comparable to Nafion 112, particularly at 60 and 80° C.

Results for the proton conductivity of the film at a controlled temperature of 80° C. and at relative humidity levels of 25, 50, 75, and 100% are shown in Table 2.

TABLE 2

| | | Comparative Example 1 (Nafion 112) | | Example 1 | |
|---|---|---|---|---|---|
| Temp [° C.] | % RH | Conductivity | Error | Conductivity | Error |
| 80 | 25 | 0.0031 | 0.00074 | 0.0010 | 0.00025 |
| 80 | 50 | 0.0129 | 0.00214 | 0.0118 | 0.00203 |
| 80 | 75 | 0.0430 | 0.00337 | 0.0427 | 0.00336 |
| 80 | 100 | 0.0763 | 0.00447 | 0.0654 | 0.00404 |

At each of the relative humidity levels tested, at a temperature of 80° C., the cross-linked polyethersulfone demonstrates proton conductivity comparable to Nafion 112.

Figure 1:
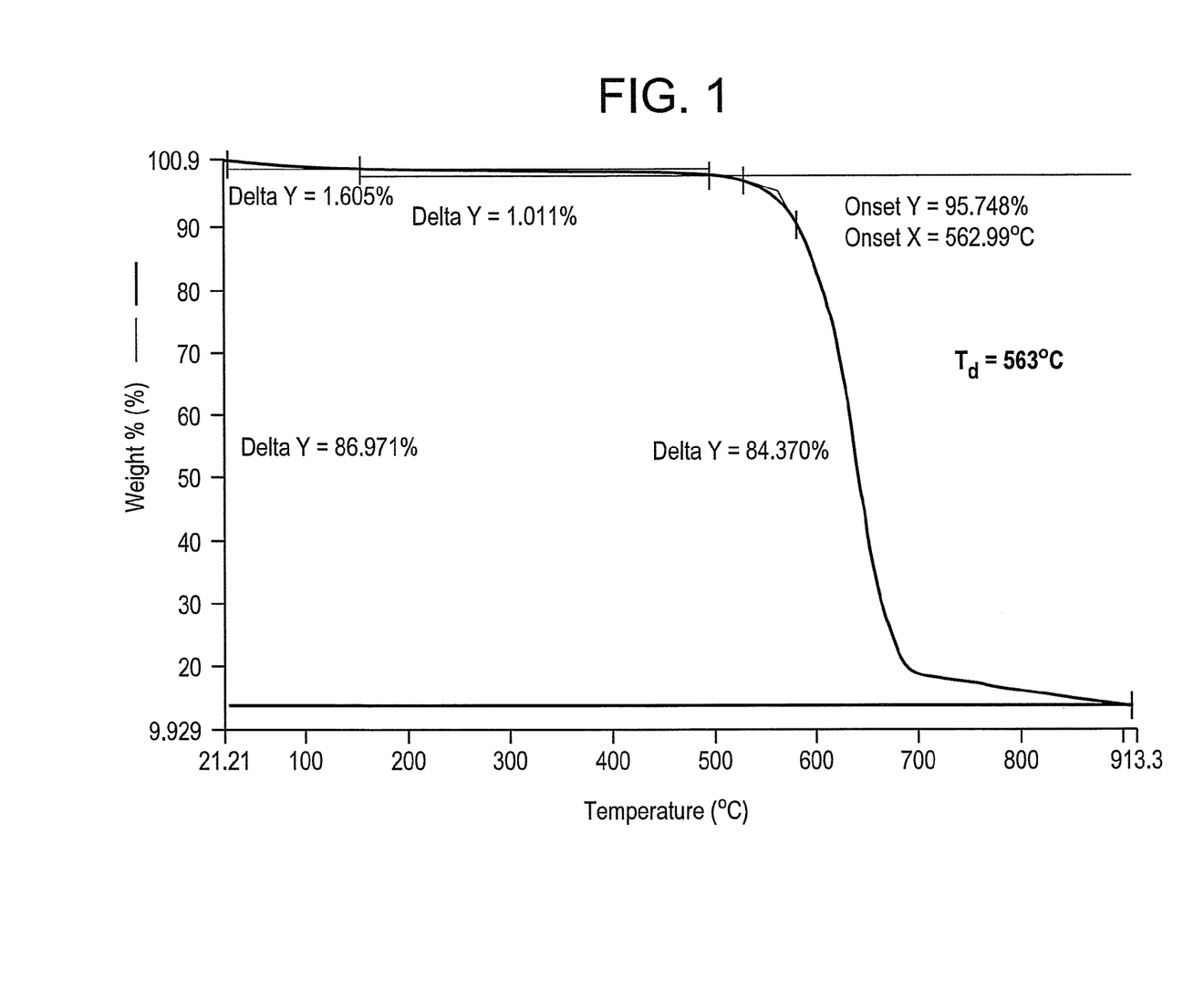
FIG. 1 is a graph illustrating the thermogravimetric profile of cross-linked polyethersulfone prior to acidification with sulfuric acid.
Figure 2:
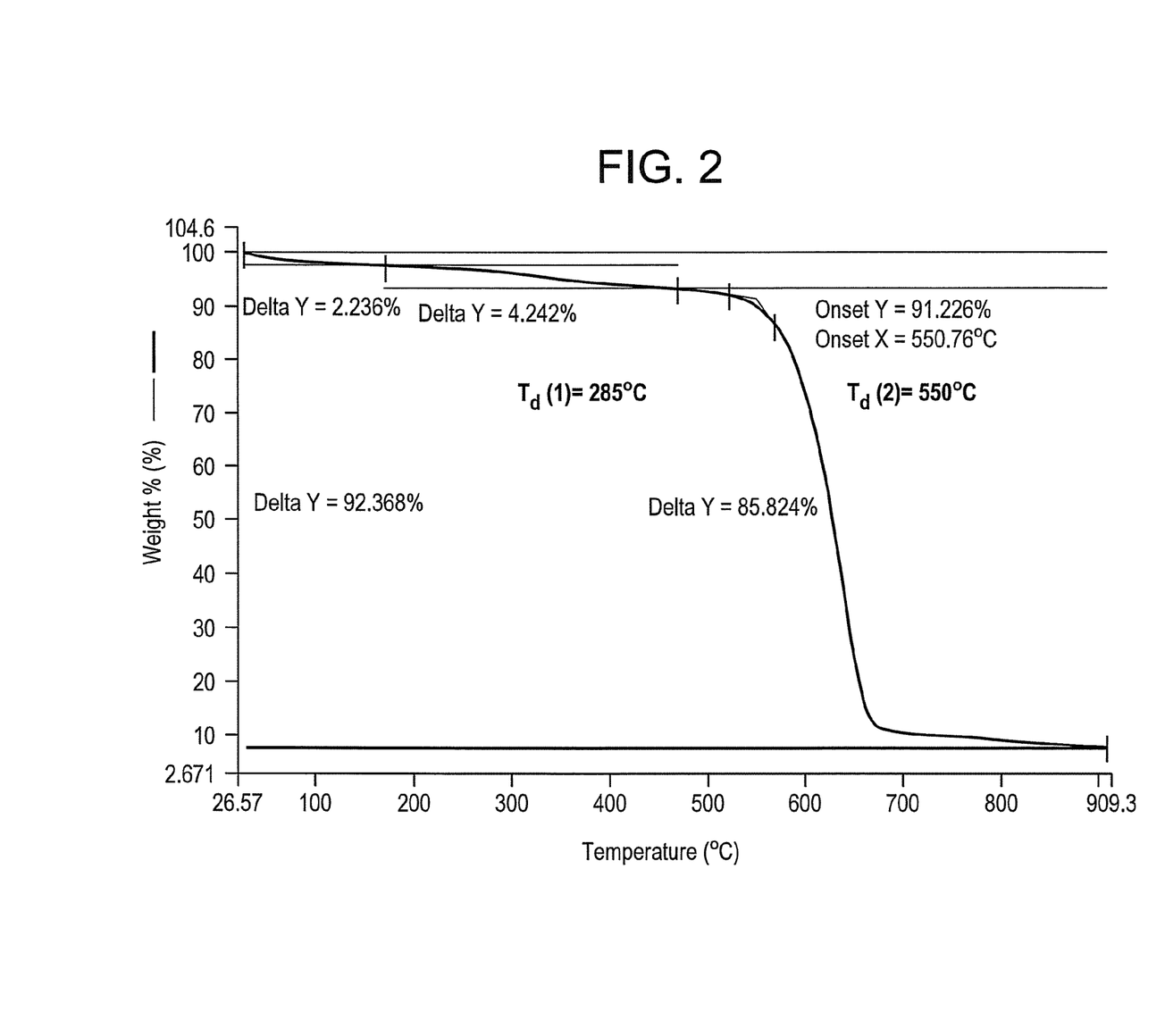
FIG. 2 is a graph illustrating the thermogravimetric profile of cross-linked polyethersulfone following acidification with sulfuric acid.

The thermal stability of the cross-linked polyethersulfone before and after acidification, was performed using a thermal gravimetric analysis (TGA) method in nitrogen. The results of this analysis can be seen in FIG. 1 and FIG. 2. FIG. 1 shows the TGA results for the membrane prior to acidification, and reveals that the decomposition temperature of the material (prior to acidification) is 563° C. FIG. 2 shows the TGA results for the polyethersulfone film following acidification.

Following acidification with $H_2SO_4$, two decomposition temperatures were observed. While not wanting to be bound by theory, it is believed the first temperature of 284° C. reflects the decomposition of the sulfonic acid group, whereas the second temperature (550° C.) reflects the decomposition temperature of the polyethersulfone backbone.

Example 2

THPE (0.23 g, 0.73 mmol) was added to a flask equipped with a dean-stark condenser. To the flask, KOH (0.122 g, 2.18 mmol), DMSO (7.7 ml) and toluene (2.3 ml) were added. The mixture was heated at 150° C. under nitrogen for 4 hours to promote the deprotonation reaction. After cooling the solution to room temperature, SDFDPS (0.5 g, 1.09 mmol) was added to the solution. The solution was heated overnight at 60° C. to dissolve the SDFDPS. The solution with the SDFDPS was cast on an expanded PTFE film and heated in an oven at 140° C. in nitrogen overnight to promote the cross-linking reaction. A light brown film was obtained.

An extraction test was carried out by placing a film in a vial filled with water. The water was boiled for 2 hours. The weight change was compared before and after the boiling. The weight loss was found to be 5.6%, which indicates the highly cross-linked structure.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method of forming an electrolyte membrane comprising:
   a forming a mixture; the mixture comprising a polyhydroxy compound,
   a an aromatic polyhalide compound and an alkali metal hydroxide;
   a disposing the mixture on a porous substrate;
   a reacting the mixture to form a proton conductor; and
   crosslinking the proton conductor to form a cross-linked proton-conducting network.

2. The method of claim 1, wherein the aromatic polyhalide compound is an aromatic sulfonated dihalide.

3. The method of claim 1, wherein the polyhydroxy compound is a compound having a structure shown in Formula (I):

wherein B is a hydrogen, alkyl, aryl or a protonic acid containing group; the protonic acid group being a sulfonate group ($-SO_3H$), a carboxylate group ($-COOH$), a phosphate group ($-PO_3H_2$), an alkylsulfonate group $-(R^4)_n SO_3H$), a sulfamoylsulfonylalkyl group or a sulfamoylsulfonylaryl group ($-SO_2NHSO_2R$) where R is alkyl or aryl, a perfluoroalkylsulfonate group ($CF_2)_nSO_3H$), a sulfonylalkylsulfonate group (SO$_2$(R$^4$)$_n$SO$_3$H), a sulfonylperfluoroalkylsulfonate group (SO$_2$(CF$_2$)SO$_3$H), a sulfamoylsulfonylalkylsulfonate group (SO$_2$NHSO$_2$(R$^4$)$_n$SO$_3$H), a sulfamoylsulfonylperfluoroalkylsulfonate group (SO$_2$NHSO$_2$(CF$_2$)$_n$SO$_3$H), an alkylcarboxylate group (—(R$^4$)$_n$COOH), a perfluoroalkylcarboxylate group (CF$_2$)$_n$CO$_2$H an alkylphosphonate group (—(R$^4$)$_n$PO$_3$H$_2$), a perfluoroalkylphosphonate group or their conjugated salts; the conjugated salts having a metal cation; R$^1$ and R$^2$ are each independently a hydrogen atom, a halogen atom, a C$_{1-10}$ alkyl group, a halogen-substituted C$_{1-10}$ alkyl group, a C$_{6-50}$ aryl group; q and r are independently integers from 1 to about 4; R$_3$ is a hydrogen atom, a halogen atom, a C$_{1-10}$ alkyl group, a halogen-substituted C$_{1-10}$ alkyl group, a C$_{6-50}$ aryl group, or a halogen-substituted C$_{6-50}$ aryl group, while R$^4$ is an alkyl, aryl or perfluoroalkyl group, X is O, S, or SO$_2$, and W is selected from the group consisting of wherein R$^c$ and R$^d$ each independently represent a hydrogen atom or a monovalent linear or cyclic hydrocarbon group, and R$^e$ is a divalent hydrocarbon group, oxygen, or sulfur.

4. The method of claim 1, wherein the polyhydroxy compound has a structure shown in Formula (II) below:

(II)

where R$^5$, R$^6$ R$^7$ and R$^8$ are each independently a hydrogen atom, a halogen atom, a C$_{1-10}$ alkyl group, a halogen-substituted C$_{1-10}$ alkyl group, a C$_{6-50}$ aryl group or a halogen-substituted C$_{6-50}$ aryl group, and n, o and p are each independently integers of 1 to about 4.

5. The method of claim 1, wherein the aromatic polyhalide compound has a structure shown in Formula (III):

(III)

where X is a halogen, R$^9$ and R$^{10}$ are each independently a hydrogen atom, a halogen atom, a C$_{1-10}$ alkyl group, a halogen-substituted C$_{1-10}$ alkyl group, a C$_{6-10}$ aryl group, or a halogen-substituted C$_{6-10}$ aryl group, s and t are each independently integers of 1 to 4, R$^{11}$ represents one of the following groups and C is a protonic acid containing group; the protonic acid containing group being a sulfonate group (—SO$_3$H), a carboxylate group (—COOH), a phosphate group (—PO$_3$H$_2$), an alkylsulfonate group (—(R$^{12}$)$_n$SO$_3$H), a sulfamoylsulfonylalkyl or sulfamoylsulfonylaryl group (—SO$_2$NHSO$_2$R), wherein R is alkyl or aryl), a perfloruoalkylsulfonate group (CF$_2$)$_n$SO$_3$H), a sulfonylalkylsulfonate group (SO$_2$(R$^{12}$)$_n$SO$_3$H), a sulfonylperfluoroalkylsulfonate group (SO$_2$(CF$_2$)SO$_3$H), a sulfamoylsulfonylalkylsulfonate group (SO$_2$NHSO$_2$(R$^{12}$)$_n$SO$_3$H), a sulfamoylsulfonylperfluoroalkylsulfonate group (SO$_2$NHSO$_2$(CF$_2$)$_n$SO$_3$H), an alkylcarboxylate group (—(R$^{12}$)$_n$COOH), a perfluoroalkylcarboxylate group (CF$_2$)$_n$CO$_2$H, an alkylphosphonate group (—(R$^{12}$)$_n$PO$_3$H$_2$), an perfluoroalkylphosphonate group or their conjugated salts; the conjugated salts having a metal cation and wherein R$^{12}$ can be an alkyl, aryl or perfluoroalkyl group.

6. The method of claim 1, wherein the aromatic polyhalide compound has the structure shown in Formula (IV):

(IV)

where X is a halogen and R$^{13}$ and R$^{14}$ are each independently a hydrogen atom, a halogen atom, a C$_{1-10}$ alkyl group, a halogen-substituted C$_{1-10}$ alkyl group, a C$_{6-10}$ aryl group, or a halogen-substituted C$_{6-10}$ aryl group; q and r are each independently integers of 1 to 3, R$^{15}$ represents one of the following groups:

-continued wherein $R^c$ and $R^d$ each independently represent a hydrogen atom or a monovalent linear or cyclic hydrocarbon group, and $R^e$ is a divalent hydrocarbon group, oxygen, or sulfur, q and r are each independently integers of 1 to 3, M represents a metal cation from Group I.

7. The method of claim 6, wherein $R^{13}$ and $R^{14}$ are each independently a hydrogen atom or a halogen atom, M is sodium, X is fluorine, and q and r are each independently integers of 1 to 3.

8. The method of claim 1, wherein the alkali metal hydroxide is potassium hydroxide.

9. The method of claim 1, further comprising adding a first solvent to the mixture.

10. The method of claim 9, wherein the first solvent is water, an organic solvent or a combination comprising water and an organic solvent.

11. The method of claim 9, further comprising adding a second solvent to the mixture, wherein the second solvent is an alcohol, water, liquid carbon dioxide, an aldehyde, a ketone, acetonitrile, a sulfoxide, a sulfone, a thiophene, an acetate, an amide, or a combination comprising at least one of the foregoing solvents.

12. The method of claim 11, wherein the second solvent is isopropyl alcohol, dimethylsulfoxide, or a combination comprising at least one of the foregoing solvents.

13. The method of claim 1, wherein the porous substrate is a polyolefin, a polyamide, a polycarbonate, a cellulosic polymer, a polyurethane, a polyester, a polyether, a polyacrylate, a copolyether ester, a copolyether amide, a fluoropolymer, or a combinations comprising at least one of the foregoing polymers.

14. The composition of claim 1, wherein the porous substrate comprises a fluoropolymer; the fluoropolymer being a polytetrafluoroethylene, a poly(vinylidene fluoride), a poly(vinylidene fluoride co-hexafluoropropylene), a poly(tetrafluoroethylene oxide-co-difluoromethylene oxide, a poly(tetrafluoroethylene-co-perfluoro(propylvinyl ether)), or a combination comprising at least one of the foregoing fluoropolymers.

15. The composition of claim 14, wherein the fluoropolymer is expanded polytetrafluoroethylene.

16. The method of claim 1, further comprising reacting the mixture to form a proton conductor before disposing the mixture on the porous substrate.

17. The method of claim 1, wherein the mixture is disposed by extrusion, brushing, spraying, transfer coating, or a combination comprising at least one of the foregoing coating methods.

18. The method of claim 1, further comprising adding a dihydroxy compound to the mixture.

19. The method of claim 1, wherein the dihydroxy compound is bisphenol A.

20. The method of claim 18, wherein a weight ratio of the dihydroxy compound to the polyhydroxy compound is about 10:1 to about 1:10.

21. The method of claim 16, wherein the electrolyte membrane comprises about 0.5 weight percent to about 50 weight percent proton conductor, based on the total weight of the electrolyte membrane.

* * * * *

UNITED STATES PATENT AND TRADEMARK OFFICE
CERTIFICATE OF CORRECTION

PATENT NO. : 8,197,955 B2
APPLICATION NO. : 12/202832
DATED : June 12, 2012
INVENTOR(S) : Tamaki et al.

It is certified that error appears in the above-identified patent and that said Letters Patent is hereby corrected as shown below:

In Column 5, Line 51, delete "–$(R^4)_nSO_3H$)," and insert -- (–$(R^4)_nSO_3H$), --, therefor.

In Column 5, Lines 53-54, delete "perfloruoalkylsulfonate group $(CF_2)_nSO_3H$)," and insert -- perfluoroalkylsulfonate group $((CF_2)_nSO_3H)$, --, therefor.

In Column 6, Line 1, delete "$R_3$" and insert -- $R^3$ --, therefor.

In Column 6, Line 40, delete "$R^6\ R^7$" and insert -- $R^6, R^7$ --, therefor.

In Column 7, Line 15, delete "–$SO_2(CF_2)nSO_2$–" and insert -- –$SO_2(CF_2)_nSO_2$– --, therefor.

In Column 7, Line 26, delete "(–$SO_2NHSO_2R$, wherein R is alkyl or aryl)," and insert -- (–$SO_2NHSO_2R$), wherein R is alkyl or aryl, --, therefor.

In Column 7, Line 27, delete "perfloruoalkylsulfonate group $(CF_2)_nSO_3H$)," and insert -- perfluoroalkylsulfonate group $((CF_2)_nSO_3H)$, --, therefor.

In Column 16, Line 39, in Claim 1, delete "a forming" and insert -- forming --, therefor.

In Column 16, Line 41, in Claim 1, delete "a an" and insert -- a --, therefor.

In Column 16, Line 43, in Claim 1, delete "a disposing" and insert -- disposing --, therefor.

In Column 16, Line 44, in Claim 1, delete "a reacting" and insert -- reacting --, therefor.

In Column 16, Line 64, in Claim 3, delete "–$(R^4)_nSO_3H$)," and insert -- -(–$(R^4)_nSO_3H$), --, therefor.

In Column 16, Lines 66-67, in Claim 3, delete "perfloruoalkylsulfonate group $(CF_2)_nSO_3H$)," and insert -- perfluoroalkylsulfonate group $((CF_2)_nSO_3H)$, --, therefor.

Signed and Sealed this
Fourteenth Day of August, 2012

David J. Kappos
*Director of the United States Patent and Trademark Office*

Page 1 of 2

CERTIFICATE OF CORRECTION (continued)
U.S. Pat. No. 8,197,955 B2

In Column 17, Line 14, in Claim 3, delete "$R_3$" and insert -- $R^3$ --, therefor.

In Column 17, Line 52, in Claim 4, delete "$R^6$ $R^7$" and insert -- $R^6$, $R^7$ --, therefor.

In Column 17, Line 63, in Claim 5, delete "$(R_9)_s$" and insert -- $(R^9)_s$ --, therefor.

In Column 18, Line 27, in Claim 5, delete "($-SO_2NHSO_2R$, wherein R is alkyl or aryl)," and insert -- ($-SO_2NHSO_2R$), wherein R is alkyl or aryl, --, therefor.

In Column 18, Lines 27-28, in Claim 5, delete "perfloruoalkylsulfonate group $(CF_2)_nSO_3H$)," and insert -- perfluoroalkylsulfonate group $((CF_2)_nSO_3H)$, --, therefor.

In Column 20, Line 9, in Claim 14, delete "oxide," and insert -- oxide), --, therefor.